(12) United States Patent
Schmidt et al.

(10) Patent No.: US 6,817,772 B2
(45) Date of Patent: Nov. 16, 2004

(54) BEARING ARRANGEMENT

(75) Inventors: Eugen Schmidt, Merbelsrod (DE);
Frank Blaurock, Schleusingerneundorf (DE)

(73) Assignee: Geräte-und Pumpenbau GmbH Dr. Eugen Schmidt, Merbelsrod (DE)

(*) Notice: Subject to any disclaimer, the term of this patent is extended or adjusted under 35 U.S.C. 154(b) by 0 days.

(21) Appl. No.: 10/622,622

(22) Filed: Jul. 18, 2003

(65) Prior Publication Data

US 2004/0136631 A1 Jul. 15, 2004

(30) Foreign Application Priority Data

Jan. 10, 2003 (DE) .......................... 103 00 611

(51) Int. Cl.[7] .............................. F16C 19/06
(52) U.S. Cl. ......................... 384/537; 489/903
(58) Field of Search .................. 384/537, 489, 384/903, 547, 585

(56) References Cited

U.S. PATENT DOCUMENTS 5,238,310 A * 8/1993 Layfield ............... 384/903
6,003,407 A * 12/1999 Cavalier ............... 384/271

FOREIGN PATENT DOCUMENTS

DE        31 15 752       11/1982

* cited by examiner

Primary Examiner—Lenard A. Footland
(74) Attorney, Agent, or Firm—Collard & Roe, P.C.

(57) ABSTRACT

A bearing arrangement for pump bearings mounted in plastic housings, in particular for coolant pumps, comprises a radial housing groove that is provided with an inlet bore, the groove being arranged in the coolant pump housing. A bearing groove located opposite the housing groove in the final mounted condition is provided on the bearing ring arranged in the bearing seat. This arrangement can be manufactured and mounted in a simple manner, permits tempering of the plastic housing, always ensures a high degree of efficiency of the pump with minimal manufacturing and installation expenditure, and permits the use of bearings as pump bearings with minor play of the bearing with a longer service life, low development of noise, and relief of the shaft sealing gasket, and many other benefits. The bearing arrangement always ensures high transmission of the axial forces from the pump bearing to the pump housing, combined with an optimal geometry of the sealing gap, and permits removal of the pump bearing without damaging the plastic housing, and, at the same time, reduces the recycling costs.

6 Claims, 4 Drawing Sheets

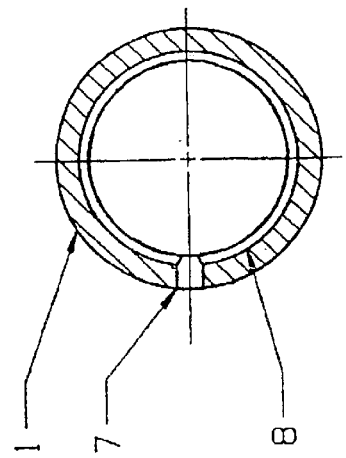
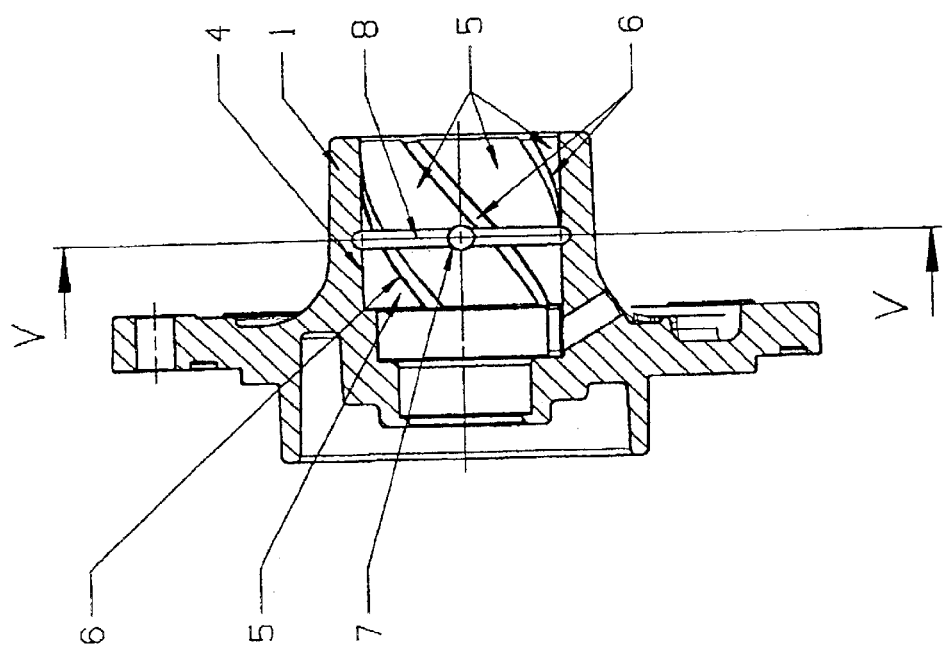

BEARING ARRANGEMENT

BACKGROUND OF THE INVENTION

1. Field of the Invention

The invention relates to a bearing arrangement for pump bearings in plastic housings such as in coolant pumps.

2. The Prior Art

Coolant pumps with plastic housings are known. In connection with this type of construction, the pump bearing is positioned in the injection molding die before the injection molding process is started, and integrated in the plastic housing in a safely secured position in the course of the injection molding process.

This method of securing the bearing has drawbacks in that during the injection molding process, the pump bearing is subjected to temperatures of up to 400° C., which subjects the pump bearing to high thermal stresses. During the cooling process, the bearing sleeves are then radially distorted in the plastic material and often even deformed in this process. In the course of the subsequent manufacturing steps, the bearings then have to be greased and sealed.

In addition to the increased manufacturing and mounting expenditure connected therewith, the plastic coolant pumps with the pump bearing integrated therein in the injection molding process have the further drawback that the pump bearings must have a relatively high amount of clearance due to the technologically conditioned distortion of the outer ring in the plastic material. Such high play of the bearing necessarily results in severe "knocking of the shaft". This makes it more difficult to seal the shaft with the shaft gasket and increases the mounting expenditure. Furthermore, this reduces the useful life of the bearing and, moreover, generates increased noise of the running pump.

Another drawback of coolant pumps with a bearing integrated in the plastic housing by injection molding consists in that these plastic housings cannot be tempered because of the pump bearing integrated therein, so that the plastic materials necessarily have a lower strength as compared to tempered plastics.

Furthermore, the recycling of plastic housings with pump bearings integrated therein by injection molding is very costly because the separation of the injected bearing from the plastic of the housing necessarily requires increased time and/or labor expenditure.

On the other hand, bearing arrangements in plastic housings of coolant pumps are known where the entire jacket surface of the pump bearing is glued into the associated plastic housing. The gluing gap between the plastic housing and the outer jacket of the bearing, which is required for transmitting the axial stresses of the bearing, requires manufacturing and mounting (or installation) tolerances that have a negative influence on the geometry of the sealing gap between the pump wheel and the associated boring of the housing, and thus on the leakage flow as an important factor influencing the degree of efficiency of the coolant pump. Thus, with justifiable manufacturing and/or mounting expenditure, coolant pumps with pump bearings glued into such pumps are either only capable of transmitting low axial stresses from the bearing to the pump housing, or the coolant pumps will then have a necessarily low degree of efficiency. Any optimization of such types of construction with glued-in pump bearings always require additional manufacturing and/or mounting expenditure, which is often very high.

SUMMARY OF THE INVENTION

It is therefore an object of the invention to develop a bearing arrangement for pump bearings in plastic housings, in particular for coolant pumps, that can be produced at favorable cost and manufactured and mounted in a simple manner, and which does not exhibit the aforementioned drawbacks afflicting the prior art, and which permits tempering of the plastic housing, which always ensures a high degree of efficiency of the pump combined with minimal manufacturing and mounting expenditure, which permits the use of bearings as pump bearings with low play of the bearing, and which offers all of the benefits resulting therefrom such as a prolonged service life, low development of noise, relief of the shaft sealing gasket, as well as many any benefits.

It is another object of the invention to provide a bearing arrangement that assures high transmission of axial force from the pump bearing to the pump housing combined with an optimal geometry of the sealing gap, and permits removal of the pump bearing without causing damage to the plastic housing, and, at the same time, clearly reduces the manufacturing and mounting expenditure as well as also the recycling cost.

These objects are achieved according to the invention by a bearing arrangement in particular for pump bearings mounted in or on coolant pump housings made of plastic, with an axial bearing support. A housing groove is arranged in the housing of the coolant pump and is provided with an inlet bore. A bearing groove, which, in the final mounted condition, is located opposite the housing groove, is provided on the bearing ring to be arranged in the seat of the bearing.

According to the invention, polyamide in the liquid state, for example, is filled via the inlet bore into the cavity formed by the groove of the housing and the groove of the bearing between the housing of the coolant pump and the bearing ring.

After the polyamide has cured, an injected plastic ring is formed in the cavity of the groove of the housing and the groove of the bearing. This plastic ring, which is connected with both the housing of the coolant pump and the bearing ring, permits a bearing arrangement for pump bearings that can be installed in the plastic housing of coolant pumps. Such a bearing system can be produced, installed and dismantled in a simple manner in terms of manufacturing technology and at favorable cost.

Due to the fact that the bearing is joined with the housing of the coolant pump only after the injection molding process has been carried out, it is also possible to distinctly improve the material properties of the plastic housing by tempering.

Since in connection with the dimensioning of the fit between the bearing and the seat of the bearing of the housing of the coolant pump, only pressed fits but no gluing gap measurements need to be taken into account, an optimal geometry of the sealing gap between the wheel of the pump and the bore of the housing can be ensured with only minimal manufacturing and mounting expenditure, and it is therefore possible to ensure a high degree of efficiency of the pump.

Because the bearings are neither injected nor clamped in any fixed manner, and any deformation of the outer bearing rings of the pump bearings is therefore avoided, it is possible to use such bearings as pump bearings with only minor play of the bearing, which results in obtaining all the benefits such as a relief of the shaft sealing gasket, which is connected with minor clearance of the bearing; a prolonged service life; low development of noise; and many others.

Because of the injected plastic ring that extends all around above the groove of the bearing and the housing of the coolant pump, and which is connected with both the bearing and the housing of the coolant pump, even high axial forces are transmitted without any problem from the pump bearing to the housing of the coolant pump.

Furthermore, by breaking the polyamide connection in a defined manner, the pump bearing can be removed without damaging the plastic housing, so that in addition to the expenditure for the manufacture and installation, the expenditure for recycling can be distinctly reduced as well.

Moreover, it is beneficial as well if the pump bearing and a shaft sealing gasket are jointly arranged in the bearing ring that is provided with a bearing groove.

In conjunction with the bearing that can be employed as defined by the invention with minor play (air) of the bearing, if the pump bearing and the shaft sealing gasket are arranged jointly, it is possible to exactly center the shaft, so that the installation of venting bores with the disadvantages resulting therefrom can be avoided.

Preferably, a running sleeve is arranged on the shaft in the area of the shaft sealing gasket in order to prevent the sealing lips of the shaft sealing gasket from becoming scored.

Either a sliding bearing or a roller (or antifriction) bearing is arranged in or on the bearing ring that is provided with a bearing groove.

It is characteristic, furthermore, that a belt pulley, which is connected to a plastic shaft, is connected with torsional strength with the outer ring of a pump bearing that is arranged on the bearing ring provided with a bearing groove. Such a pump bearing is arranged on the bearing seat, the sheet being provided with an inlet bore and a radial groove of the housing with the axial bearing support of the housing of the coolant pump, in such a manner that in the final mounted condition, the bearing groove is located opposite the housing groove, and the shaft sealing gasket is arranged directly below the pump bearing. A sleeve that is integrated on the impeller wheel is arranged on the free end of the plastic shaft. The sleeve runs in a sliding bearing that is made of plastic and arranged in the housing of the coolant pump.

This type of construction, in addition to the benefits gained according to the invention as explained above, also permits the use of a favorably priced, simple single-row grooved ball bearing with optimal running properties.

Preferably, bridges with grooves disposed between such bridges are arranged in the coolant pump housing on the periphery of the bearing seat, whereby the grooves are connected among each other by means of the housing groove that is provided with the inlet bore. These bridges simplify the manufacturing and mounting process required for joining the components due to the fact that because of the interrupted jacket surface of the bearing seat, pre-tensioning that is harmless to the bearing is made possible in the mounting process.

In the final mounted condition, after the polyamide has hardened, the grooves between the bridges increase the force- and form-locked "jointed assembly" because the surface area has been distinctly increased, and, furthermore, increase the axial force that can be transmitted between the housing and the bearing.

In that connection, the open "tie-up" of the grooves to the environment of the coolant pump housing ensures optimal venting (or bleeding) of all grooves and flutes between the housing and the bearing as the polyamide is being filled in, which leads to optimal anchoring of the bearing in the plastic housing.

The bridges with the grooves arranged therebetween can be arranged in the axial direction in a straight line, and/or slanted in relation to the axial direction, and/or curved relative to the axial direction. The shape of the bridges and the grooves arranged therebetween serves the play-free centering of the bearing and simplifies the manufacturing process due to optimal removal of the mold in the injection molding step, and, furthermore, permits increasing the maximal axial force than can be transmitted between the bearing and the housing.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 4 is a sectional side view of the type of construction according to FIG. 2 without the pump shaft and the pump bearing;

FIG. 5 shows section V—V according to FIG. 4; and

DETAILED DESCRIPTION OF THE PREFERRED EMBODIMENT

Figure 1:
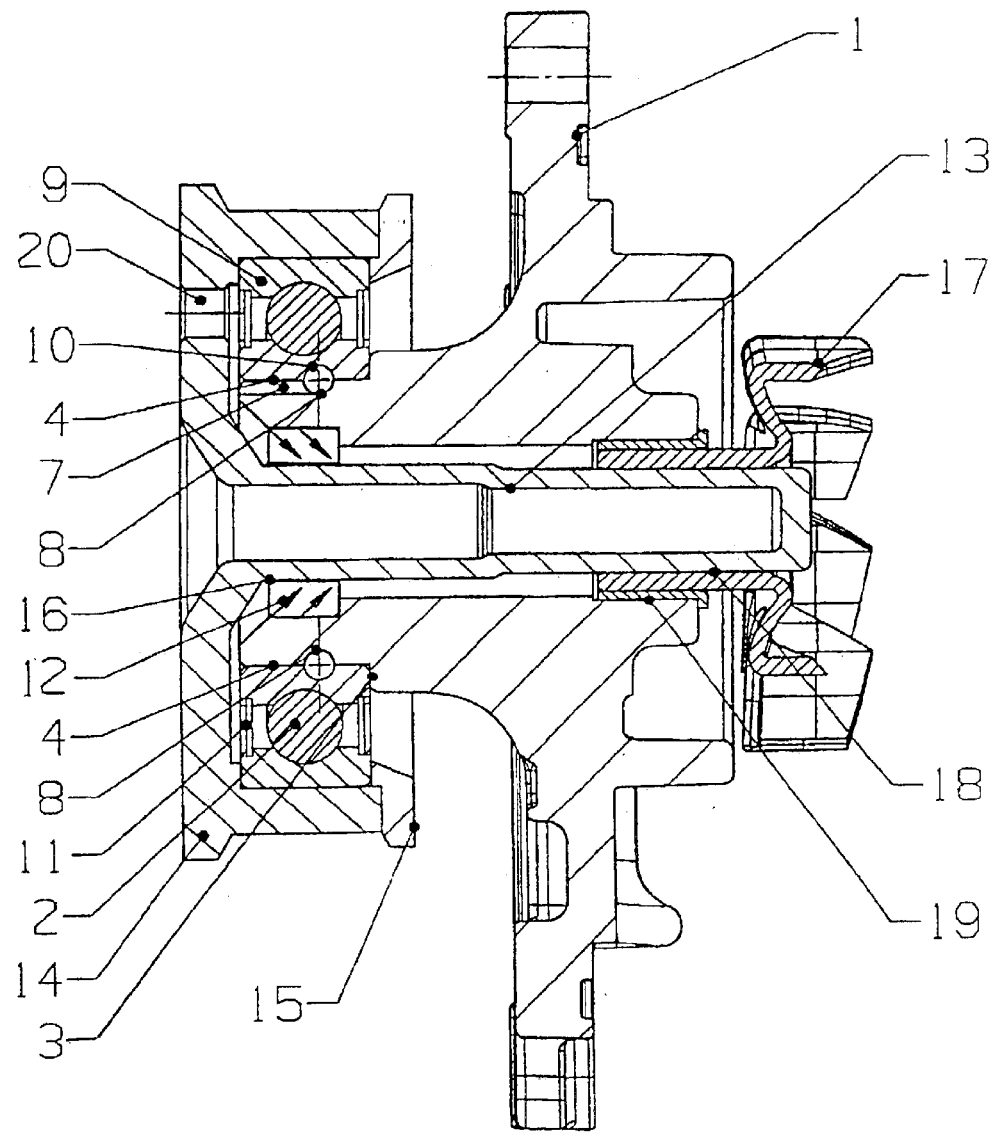
FIG. 1 shows a sectional side view of one embodiment of the bearing system as defined by the invention, with a pump bearing arranged on the outside of the coolant pump housing.

Referring now in detail to the drawings, FIG. 1 shows a sectional side view of one of the possible types of construction of the bearing arrangement as defined by the invention that comprises a pump bearing 2 which is arranged on the outside of a coolant pump housing 1 that is preferably made of plastic. On bearing seat 4 of coolant pump housing 1 with axial bearing support 3, said bearing seat being provided with an inlet bore 7 and a radial housing groove 8, bearing ring 9, which is provided with a bearing groove 10, is arranged in such a manner that in the final mounted condition, bearing groove 10 is located opposite housing groove 8.

In this embodiment, polyamide in the liquid state is filled into the cavity that is formed by housing groove 8 and bearing groove 10, via inlet bore 7. After the polyamide has hardened, a plastic ring is formed in the cavity between bearing seat 4 of the housing and bearing ring 9. This cavity is connected with both the housing and bearing ring 9 and permits producing a bearing system for pump bearings preferably accommodated in a plastic housing, in particular for coolant pumps. This bearing system can be manufactured and mounted in a simple manner in terms of manufacturing technology, and at favorable cost.

Since the antifriction bearing is connected with coolant pump housing 1 only after the injection molding process, it is possible to already install antifriction bearings provided with gaskets 11. Furthermore, it is possible with the invention to distinctly enhance the properties of the material of the plastic housing before the antifriction bearings are installed.

After the outer ring of pump bearing 2 has been mounted, a cover ring 15 is arranged on belt pulley 14 which is connected to a plastic shaft 13, in such a way that it supplements the contour of belt pulley and at the same fixes the outer ring of pump bearing 2.

The arrangement of pump bearing 2 as defined by the invention directly below the line of action along which of the force of the belt engages, ensures that no bending moments have to be transmitted via plastic shaft 13.

Furthermore, a shaft sealing gasket 15 is arranged directly below pump bearing 2 between plastic shaft 13 and coolant pump housing 1. Knocking of the shaft is minimized as a result of this special arrangement, so that a high sealing effect can be realized and leakage can be minimized.

A running sleeve 16 is arranged on plastic shaft 13 in order to prevent the sealing lips from becoming scored. A venting bore 20 is arranged on the face side of the belt pulley in order to ensure pressure compensation on the shaft sealing gasket.

A sleeve 18 integrated on impeller wheel 17 is arranged on the free end of plastic shaft 13. This sleeve runs in a sliding bearing 19 made of plastic, which is arranged in coolant pump housing 1.

Figure 2:
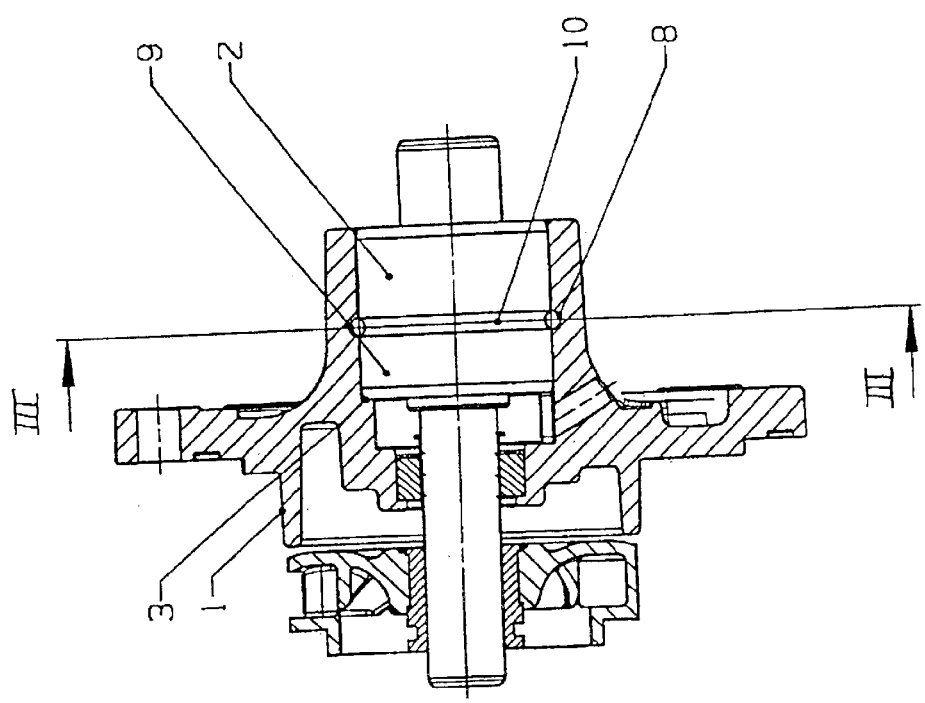
FIG. 2 is a sectional side view of another embodiment of the bearing system as defined by the invention, with a pump bearing arranged on the inside within the coolant pump housing.

FIG. 2 is a sectional side, view of another possible type of construction of the bearing system as defined by the invention. This bearing arrangement is comprised of a pump bearing 2 that is arranged on the inside of coolant pump housing 1, an axial bearing support 3, and a radial housing groove 8 that is provided with an inlet bore.

A bearing groove 10 is arranged on bearing ring 9 that is arranged in the bearing seat. In the final mounted condition, bearing groove 10 is located opposite housing groove 8.

Because with this type of construction, only pressed fits have to be taken into account for dimensioning the fit between bearing ring 9 and bearing seat of the coolant pump housing 1, but not any gluing gap dimensions, it is possible to realize an optimal geometry of the sealing gap between the pump wheel and the bore of the housing, and thus a high degree of efficiency of the pump, with only minimal manufacturing and mounting expenditure.

Figure 3:
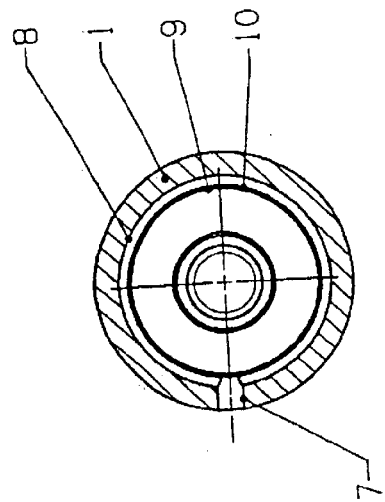
FIG. 3 shows section III—III according to FIG. 2.

FIG. 3 shows the section at III—III according to FIG. 2, with the inlet bore 7 arranged in the coolant pump housing 1 and feeding into radial housing groove 8 and bearing groove 10, which is disposed opposite housing groove 8.

Polyamide in the liquid state is filled via inlet bore 7 into the cavity formed by housing groove 8 and bearing groove 10 between coolant pump housing 1 and bearing ring 9. After the polyamide has hardened, an injected plastic ring is formed in the cavity between the housing and bearing ring 9 that is connected with both coolant pump housing 1 and bearing ring 9. This plastic ring creates bearing arrangement for pump bearings plastic housings in coolant pumps, for example. Such a bearing arrangement can be manufactured and mounted in a simple manner in terms of manufacturing technology, and at favorable cost.

Since the bearings are connected with the coolant pump housings only after the injection molding process, it is possible before the installation of the bearings to distinctly improve the material properties of the plastic of the housing by tempering.

As the bearings are not injected and thus any deformation of the outer bearing rings of the pump bearings in the plastic housing is avoided, it is possible to employ bearings with minor play and all the benefits connected therewith as pump bearings.

Due to the injected plastic ring, which, in the final mounted condition, extends all around across bearing groove 10 and housing groove 8, and which is connected with both the bearing and coolant housing 1, it is possible to transmit high axial forces from pump bearing 2 to coolant pump housing 1.

Furthermore, with the invention, it is possible to remove pump bearing 2 in a simple manner by breaking the polyamide connection in a defined way without damaging the plastic housing of the coolant pump, so that in addition to the distinct reduction of the expenditure for the manufacture and installation, the recycling cost is clearly reduced as well.

FIG. 4 is a sectional side view of the type of construction according to FIG. 2 shown without the pump shaft with the pump bearing. This representation clearly shows that bridges 5 are arranged next to housing groove 8 in the coolant pump housing 1 on the periphery of bearing seat 4, with grooves 6 located between the bridges. Grooves 6 are connected among each other by means of housing groove 8 that is provided with inlet bore 7.

These additional bridges further simplify the manufacturing and mounting expenditure required for the assembly because due to the interrupted design of the jacket surface of the bearing seat, minor pre-tensioning is made possible in the mounting step that is harmless to the bearing. On the other hand, the grooves, which are filled with cured (or hardened) polyamide in the final mounted condition, increase the axial force that can be transmitted between the housing and the bearing due to the clearly enlarged surface area of the force- and form-locked "jointed connection".

At the same time, the open "tie-up" of grooves 6 with the environment of the housing ensures optimal bleeding of all grooves and flutes between the housing and the bearing when the polyamide is filled in, so that after the cavities have been filled, and following curing of the polyamide that has been filled into the cavities, very good anchoring of the bearing in the plastic housing is achieved.

In the present case, bridges 5 with grooves 6 arranged therebetween are arranged slanted in relation to the axial direction, with a very steep slope. This type of embodiment of bridges 5 and of grooves 6 centers the bearing without play, and at the same time permits optimal removal of the housing from the mold after the injection molding step.

FIG. 5 shows a section at V—V according to FIG. 4, with inlet bore 7, which is arranged in coolant pump housing 1 and feeding into radial housing groove 8.

Figure 6:
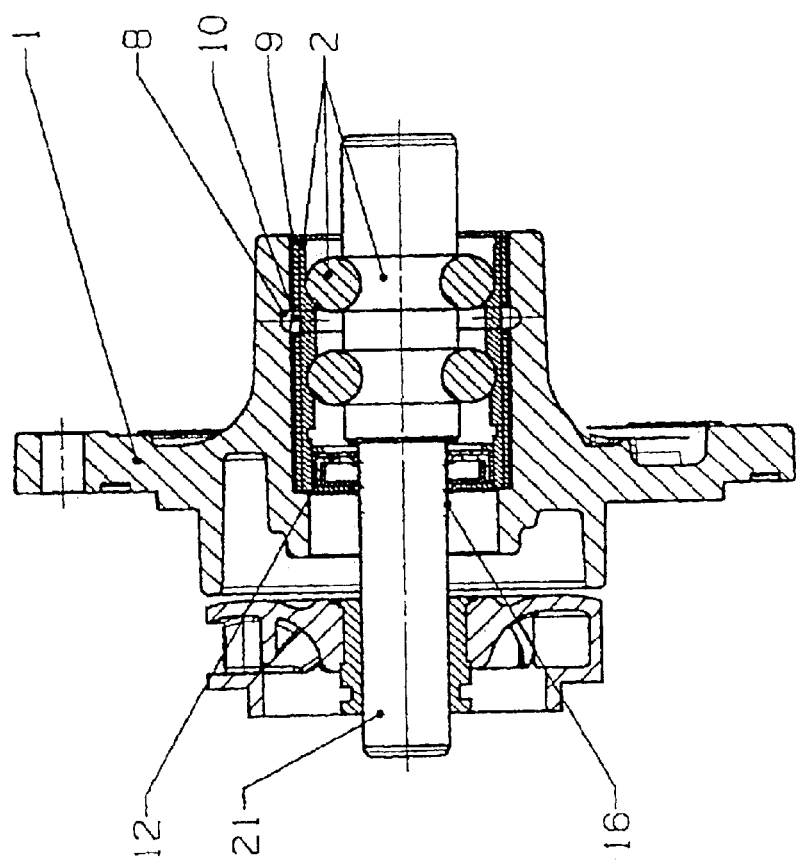
FIG. 6 is a sectional side view of a special type of construction of the bearing system as defined by the invention, with the pump bearing arranged on the inside of the housing of the coolant pump.

FIG. 6 shows a sectional side view of a special type of construction of the bearing system as defined by the invention, with the pump bearing arranged on the inside of the coolant pump housing. A pump bearing 2 and a shaft sealing gasket 12 are jointly arranged in bearing ring 9 that is provided with a bearing groove 9.

In conjunction with the bearings as defined by the invention, which have only a very minor amount of play, a very precisely centered run of shaft 21 can be realized if pump bearing 2 and shaft sealing gasket 12 are jointly arranged in bearing ring 9, so that the installation of venting bores with the drawbacks resulting therefrom can be avoided.

It is beneficial if a running sleeve 16 is arranged on shaft 21 in the area of shaft sealing gasket 12 in order to avoid scoring of the sealing lips.

It has been successfully possible due to the invention to develop a pump arrangement for pump bearings in plastic housings, in particular for coolant pumps, that can be produced and mounted in a simple manner in terms of manufacturing technology and realized at favorable cost. Such a pump arrangement permits tempering of the plastic housing; it always ensures a high degree of efficiency of the pump combined with minimal manufacturing and installation expenditure; and permits the use of the bearings as pump bearings with minor play of the bearing and all the benefits resulting therefrom, such as a longer service life, low development of noise, relief of the shaft sealing gasket, and many more. In addition, high transmission of the axis forces from the pump bearing to the pump housing is always ensured, combined with an optimal geometry of the sealing gap. Moreover, the pump bearing can be removed without damaging the plastic pump housing, and the expenditure for its manufacture and mounting and also the recycling costs are distinctly reduced.

Accordingly, while only a few embodiments of the present invention have been shown and described, it is obvious that many changes and modifications may be made thereunto without departing from the spirit and scope of the invention.

List of Reference Numerals

1 Coolant pump housing
2 Pump bearing
3 Bearing support
4 Bearing seat
5 Bridge
6 Groove
7 Inlet bore
8 Housing groove
9 Bearing ring
10 Bearing groove
11 Sealing gasket
12 Shaft sealing gasket
13 Plastic shaft
14 Belt pulley
15 Cover ring
16 Running sleeve
17 Impeller wheel
18 Sleeve
19 Sliding bearing
20 Venting bore
21 Shaft

What is claimed is:

1. A bearing arrangement for plastic coolant pump housings with an axial bearing support, comprising:
    a radial housing groove provided with an inlet bore, said groove being disposed in the coolant pump housing; and
    a bearing ring arranged in a bearing seat and having a bearing groove opposing the housing groove in a final mounted condition.

2. The bearing arrangement according to claim 1, further comprising a pump bearing and a shaft sealing gasket jointly arranged in the bearing ring.

3. The bearing arrangement according to claim 1, further comprising a sliding bearing or a roller bearing arranged in or on the bearing ring.

4. The bearing arrangement according to claim 1, further comprising a belt pulley connected with a plastic shaft and being connected with torsional strength to an outer ring of a pump bearing arranged on the bearing ring, said pump bearing being arranged on the bearing seat, and being provided with an inlet bore and a radial housing groove with an axial bearing support, such that in a final mounted condition, the bearing groove is located opposite the housing groove and a shaft sealing gasket is directly arranged below the pump bearing, wherein a sleeve integrated on an impeller wheel is arranged on a free end of the plastic shaft, said sleeve running in a sliding bearing made of plastic and arranged in the coolant pump housing.

5. The bearing arrangement according to claim 1, further comprising bridges with grooves arranged therebetween, said bridges being arranged in the coolant pump housing on a periphery of the bearing seat, wherein the grooves are connected among one another by the housing groove.

6. The bearing arrangement according to claim 5, wherein the bridges are arranged in a straight line in an axial direction or slanted in relation to the axial direction, or curved relative to the axial direction.

* * * * *